United States Patent
Nomura et al.

(10) Patent No.: US 7,133,402 B2
(45) Date of Patent: Nov. 7, 2006

(54) LINK IDENTIFIER ASSIGNMENT SYSTEM IN CONNECTION-ORIENTED COMMUNICATION NETWORK

(75) Inventors: Yuji Nomura, Kawasaki (JP); Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 997 days.

(21) Appl. No.: 10/115,511

(22) Filed: Apr. 3, 2002

(65) Prior Publication Data

US 2003/0012189 A1 Jan. 16, 2003

(30) Foreign Application Priority Data

Jul. 16, 2001 (JP) ............................. 2001-215667

(51) Int. Cl.
*H04L 12/28* (2006.01)
(52) U.S. Cl. .................. 370/389; 370/400; 370/238
(58) Field of Classification Search ................ None
See application file for complete search history.

(56) References Cited

U.S. PATENT DOCUMENTS

| 5,655,134 | A | * | 8/1997 | Yamazaki ................... 712/1 |
| 6,501,754 | B1 | * | 12/2002 | Ohba et al. ................ 370/389 |
| 6,721,269 | B1 | * | 4/2004 | Cao et al. ................... 370/227 |
| 2001/0002192 | A1 | * | 5/2001 | Fujita ........................ 370/252 |
| 2001/0019554 | A1 | * | 9/2001 | Nomura et al. ............. 370/389 |

OTHER PUBLICATIONS

Yanhe Fan, et al. "Extensions to CR-LDP and RSVP-TE for Optical Path Set-up" MPLS Working Group, Mar. 2000.
J.Ash et al. "LSP Modifications on Using CR-LDP" MPLS WG, Mar, 2001.
Peter Ashwood-Smith et al. "Generalized MPLS-Signaling Functional Description" Network Working Group, May 2001.
Shinya Kano, et al. "A Study of GMPLS Control Architecture in Photonic IP Networks" Fujitsu Laboratories.
Shinya Kano, et al. "The Integrated Control Method for the Optical Layer and the Packet Layer Using GMPLS" Fujitsu Laboratories.

* cited by examiner

*Primary Examiner*—Bob A. Phunkulh
(74) *Attorney, Agent, or Firm*—Katten Muchin Rosenman LLP

(57) ABSTRACT

The same label value is assigned to all links configuring a connection in a network where an LSP (Label switched Path) is identified based on a label. Even when any one of nodes included in the connection is shortcut due to a change of route of the connection, a neighboring node to this shortcut node in the transmitting direction can receive, from a neighboring node to the shortcut node in the receiving direction, a packet having the same label value as a label value received from the LSR.

28 Claims, 13 Drawing Sheets

BEFORE SHORTCUT

ELECTRIC SWITCH (LSR: LABEL SWICH ROUTER)
OPTICAL SWITCH (OXC: OPTICAL CROSS CONNECT)

AFTER SHORTCUT

| NAME OF LSP | ROUTING NODES | LINKING OPTICAL PATHS |
|---|---|---|
| LSP1 | A-C-D-E | OP1-OP3-OP5 |
| LSP2 | A-C-D-F | OP1-OP3-OP6 |
| LSP3 | B-C-D-E | OP2-OP3-OP5 |
| LSP4 | B-C-D-F | OP2-OP3-OP6 |
| LSP5 | C-D | OP4 |

MPLS LABEL 20 BITS

| HIGH-ORDER 8 BITS | LOW-ORDER 12 BITS |
|---|---|
| EIGENVALUE TO LSR | UNIQUE VALUE TO EVERY LSR |

| NAME OF LSP | ROUTING NODES | LABEL VALUE | |
|---|---|---|---|
| | | HIGH-ORDER | LOW-ORDER |
| LSP1 | A-C-D-E | 1 | 0 |
| LSP2 | A-C-D-F | 1 | 1 |
| LSP3 | B-C-D-E | 2 | 0 |
| LSP4 | B-C-D-F | 2 | 1 |
| LSP5 | C-D | 3 | 0 |

BEFORE SHORTCUT

AFTER SHORTCUT

LINK IDENTIFIER ASSIGNMENT SYSTEM IN CONNECTION-ORIENTED COMMUNICATION NETWORK

BACKGROUND OF THE INVENTION

1. Field of the Invention

The present invention relates to a system applied to a network where a connection is identified based on a link identifier according to a protocol such as MPLS (Multiprotocol Label Switching) and so on.

2. Description of Related Art

A connection-oriented communication is one category of communication methods. One of the networks adopting the connection-oriented communications is that nodes on a high-order layer are connected by a low-order layer network (link and nodes on a low-order layer). In this case, the nodes on the high-order layer are connected by a low-order layer connection established on the links and the nodes on the low-order layer, thus establishing a neighboring relationship between the nodes on the high-order layer. Typical examples of this type of network are a network wherein MPLS nodes (called LSRs (Label Switching Routers) and known also as label packet routers) connected by an optical wavelength network, and an MPLS network hierarchized by a label stack and the like. Thus, there are cases where the relationship between the high-order and the low-order is established between different layers and between layers of the same category.

If the network is configured by the MPLS network and the optical wavelength network, the optical wavelength network corresponds to the low-order layer network, while the MPLS network corresponds to the high-order layer network. The MPLS nodes are connected to each other via optical paths (OPs) corresponding to the links and optical switches (optical cross connects (OXCs)) corresponding to nodes on the low-order layer, and are further logically connected via connections (LSPs (Label Switched Paths)) established on the optical paths and the optical cross connects on the high-order layers. If the two LSRs are directly (without via other LSRs) connected by the high-order link, these LSRs are adjacent (neighboring) to each other.

If there are three or more pieces of LSRs, the LSP might be established in a state of extending across one or more LSRs. For example, if the MPLS network accommodates three LSRs functioning as an ingress (start) router, an intermediate (relay or forwarding) router and an egress (end) router, the ingress LSR and the egress LSR are connected by an LSP extending via the intermediate LSR. In this case, the intermediate LSR is bypassed due to a change in topology of the optical wavelength network and so on, and the ingress LSR and the egress LSR may be directly connected by the link. This is known as "shortcut (cut-through)". When the "shortcut" is carried out, the adjacent relationship between the LSRs changes. The "shortcut" is performed in order to keep a QoS (Quality of Service) in the communications if a performance of, e.g., the intermediate LSR declines, or if a trouble occurs in the link to the intermediate LSR.

In the MPLS network, a packet having information set in its MPLS header (which may be called a labeled packet) is forwarded on the LSP (between the LSRs) according to the label value that is set the MPLS header. The label value is a unique value determined for (assigned to) a link between the neighboring LSRs and has validity only between the neighboring LSRs. Hence, if the adjacent relationship between the LSRs changes because of the shortcut routing, the label values used so far become invalid. Accordingly, if the shortcut occurs, a process of assigning a new label value is executed.

For instance, as shown in FIG. 13A, there is assumed a network wherein routers LSR-A, LSR-B, LSR-C and LSR-D are connected by the optical wavelength network including optical cross connects OXC-1, OXC-2 and OXC-3. Further, there is considered a case in which optical paths (high-order links) configuring the LSP extending between the LSR-A and the LSR-D are established respectively between the LSR-A and the LSR-B, between the LSR-B and the LSR-C and between the LSR-C and the LSR-D. Namely, the case to be considered is that the LSP extending from the LSR-A via the LSR-B and the LSR-C to the LSR-D is established.

In this case, the respective LSRs-A, B, C and D determine the label values used for forwarding the packet by utilizing a protocol such as LDP (Label Distribution Protocol) and others. At this time, for example, as the packet forwarding label values, a label value "L1" is determined for the link between the LSR-A and the LSR-B, a label value "L2" is determined for the link between the LSR-B and the LSR-C, and a label value "L3" is determined for the link between the LSR-C and the LSR-D. These label values assigned locally between the LSRs. When establishing the LSP between the LSR-A and the LSR-D, the label values "L1", "L2" and "L3" are, after the protocol such as LDP has been exchanged between the LSRs-A, B, C and D, assigned to the links between these LSRs. Thereafter, each of the LSRs forwards the received packet to the neighboring LSR in accordance with the label value attached to this packet. For example, the LSR-C, when receiving the packet attached with the label value "L2" from the LSR-B, replaces the label value "L2" with the label value "L3" to be attached to the packet and forwards this labeled packet to the LSR-D.

Herein, as shown in FIG. 13B, there is considered a case where the OXC-1 links the optical path between the LSR-A and the LSR-B to the optical path between the LSR-B and the LSR-C with the result that the LSR-B is shortcut. In this case, the LCR-C receives the packet attached with the label value "L1" from the LSR-A instead of receiving the packet attached with the label value "L2" from the LSR-B. The LSR-C is not, however, learned about receiving the packet attached with the label value "L1". Hence, the LSR-C is unable to specify the LSR (an output interface for the packet) to which the packet should be forwarded. As a result, the LSR-C is unable to forward the packet attached with the label value "L3" to the LSR-D.

The packet forwarding from the LSR-A to the LSR-D after the shortcut has been done in a way that avoids such a situation needs a scheme of reassigning valid label values to the links between the LSR-A and the LSR-C and between the LSR-C and the of reassigning a label value "L4" to the link between the LSR-A and the LSR-C and a label value "L5" to the link between the LSR-C and the LSR-D in accordance with the protocol such as LDP.

The following problems, however, arise when reassigning the above label values each time the shortcut is carried out.

A problem (A) is that a processing load on the protocol for assigning the labels on the high-order layer rises.

A problem (B) is that the communications are interrupted during a period till the label assignment on the high-order layer is completed after the shortcut on the low-order layer has been done.

Thus, according to the prior art, the shortcut must be performed in order to keep the QoS etc in the communication in some cases, and the shortcut routing has a problem of causing an increased cost technically and in time. In general, this problem happens when the route of the connection is changed in the connection-oriented communication network.

SUMMARY OF THE INVENTION

It is a primary object of the present invention to provide a link identifier assignment system capable of restraining an increased cost derived form a rise in processing due to a change in route of a connection and an interruption of the communications and so on.

To accomplish the above object, according to one aspect of the present invention, a link identifier assignment system in a connection-oriented communication network, comprises a determination module for obtaining, if a connection having a possibility of changing a route is established, the same link identifier value assigned to all links contained in this connection in a network where a data block is transferred on the connection established by a plurality of nodes and by a plurality of links between the nodes, and the link for forwarding the data block is identified by a link identifier attached to the data block in each of the nodes, and a notifying module for notifying all of the nodes contained in the connection, of the determined link identifier value, wherein each of the nodes stores the notified link identifier value to forward the data block attached with this link identifier value via the link assigned with this link identifier value, and, when having a neighboring node in a receiving direction on the connection and even if the neighboring node in the receiving direction is changed to other node due to making the change of the route, receives the data block attached with the link identifier value of which the other neighboring node notifies.

According to another aspect of the present invention, a link identifier assignment system in a connection-oriented communication network, comprises a determination module for obtaining, if a connection including a relay node having a possibility of being shortcut is established, the same link identifier value assigned to links that link the relay node to neighboring nodes respectively in the data block receiving/transmitting directions in a network where a data block is transferred on the connection established by a plurality of nodes and by a plurality of links between the nodes, and the link for forwarding the data block is identified by a link identifier attached to the data block in each of the nodes, and a notifying module for notifying at least the relay node and the two neighboring nodes of the determined link identifier value, wherein the neighboring node in the receiving direction stores the notified link identifier value, then attaches, when receiving the data block, the notified link identifier value to this data block, and forwards this data block via the link assigned with the notified link identifier value, the relay node stores the notified link identifier value, and, when receiving the data block attached with the notified link identifier value, forwards the data block via the link assigned with the link identifier value attached to the data block, and the neighboring node in the transmitting direction stores the notified link identifier value in order to identify the link for forwarding the data block on the basis of this notified link identifier value, then receives, if the relay node is not shortcut, the data block attached with the notified link identifier value from the relay node, and receives, if the relay node is shortcut, the data block attached with the notified link identifier value from the neighboring node in the receiving direction.

According to the present invention, the same value link identifier is assigned to all the links configuring the connection in the network where the connection is identified based on the link identifier. Accordingly, even when any one of the nodes included in the connection is shortcut due to the change in the route of the connection, the neighboring node disposed downstream (in the transmitting direction) adjacent to the shortcut node can receive the data block attached with the link identifier having the same value as that of the link identifier received from the shortcut node, from the neighboring LSR disposed upstream (in the receiving direction) adjacent to the shortcut node. It is therefore feasible to restrain the increased cost derived from the reassignment of the link identifiers and the interruption in communications that is caused by this reassignment and so forth.

BRIEF DESCRIPTION OF THE DRAWINGS

FIG. 4 is a table showing LSPs established in the network.

DESCRIPTION OF THE PREFERRED EMBODIMENTS

Embodiments of the present invention will hereinafter be described with reference to the accompanying drawings. An architecture in each of the embodiments is exemplification, and the present invention is not limited to the architectures in the embodiments.

[Outline of the Present Invention]

What is characteristic of the present invention is a cut-through (shortcut) architecture in which a link identifier (e.g., a label) assignment device provided in a node (e.g., an LSR) or disposed in a communicable state with the node, assigns a link identifier having the same (fixed) value to links before and after at least the node that is shortcut, thereby eliminating a necessity of reassigning the link identifier after the shortcut has been done.

Figure 1A:
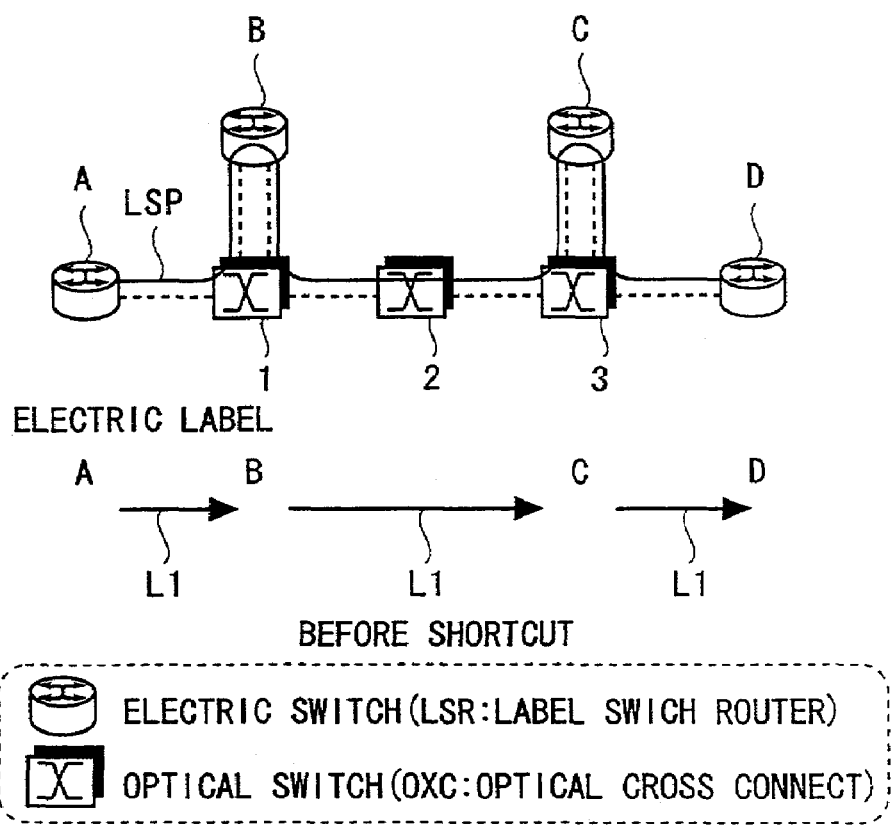
FIGS. 1A and 1B are explanatory diagrams showing an outline of the present invention.
Figure 1B:
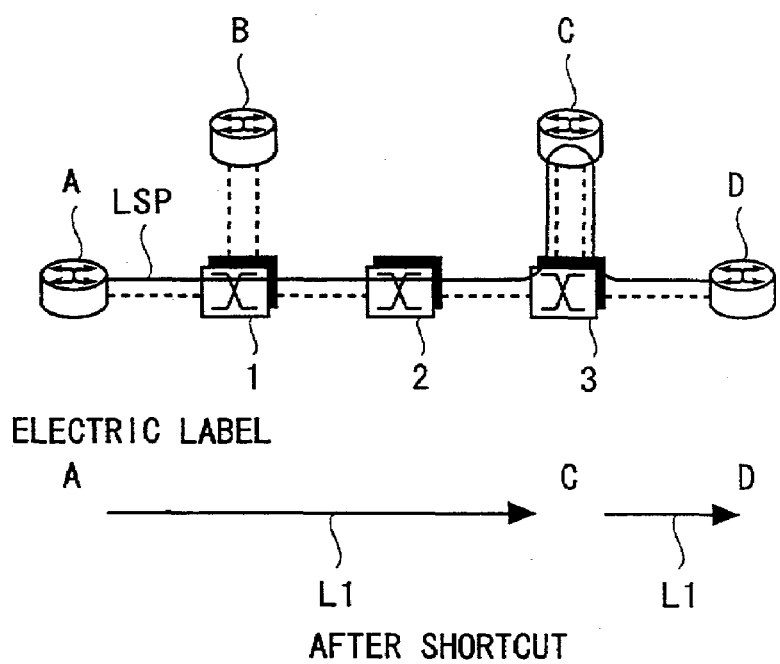
Figure 13A:
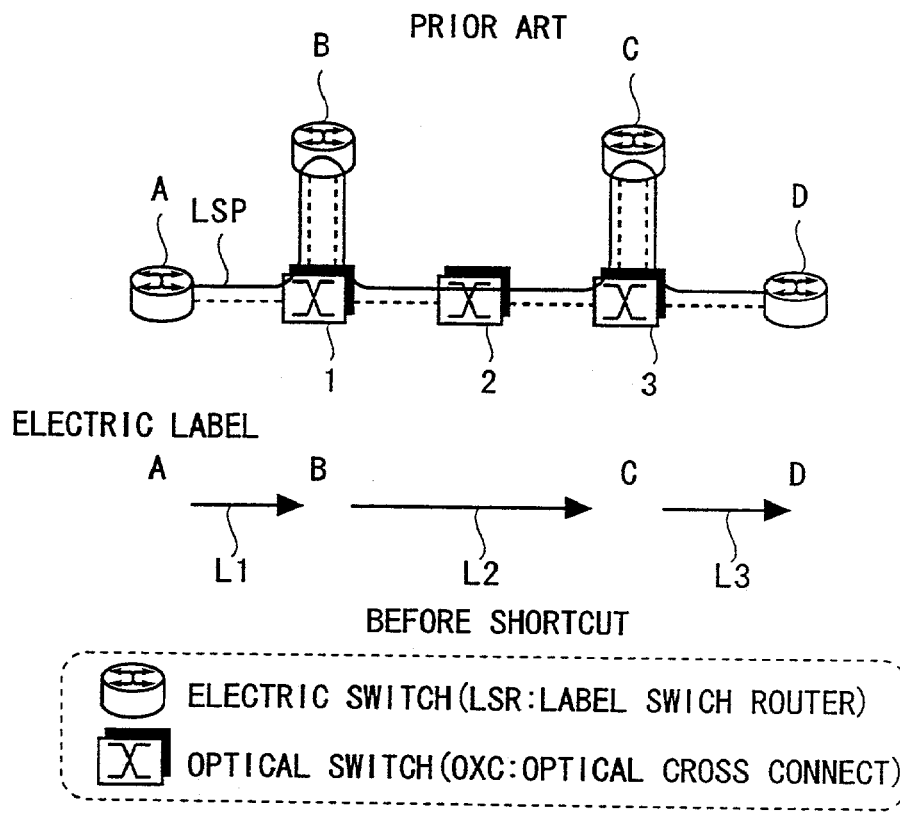
FIGS. 13A and 13B are explanatory diagram showing prior art.
Figure 13B:
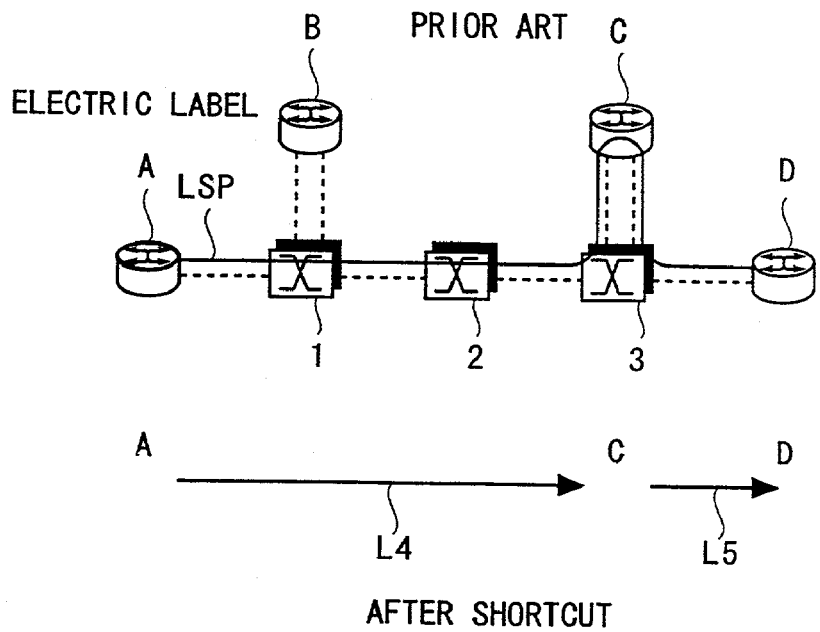

FIGS. 1A and 1B are explanatory diagrams showing an operation according to the present invention, wherein a network as shown in FIG. 13 is exemplified. Referring to FIG. 1A, an LSP (Label Switched Path) is established as a connection that connects an LSR-A(Label Switching Router A) and an LSR-D (Label Switching Router D). This LSP is configured by the LSR-A, LSR-B, LSR-C, LSR-D, and a plurality of optical paths establishing a connection between the LSR-A and the LSR-B, a connection between the LSR-B and the LSR-C and a connection between the LSR-C and the LSR-D. Each of these optical paths functions as an LSR-to-LSR link within the LSP accommodating these LSRs on a higher-order layer.

When establishing the LSP, label values used for the LSRs-A, B, C and D to forward the packet are determined based on a label assignment protocol such as LDP (Label Distribution Protocol). According to the present invention, the same label value (the label value is, e.g., "L1") is assigned to the LSP that connects the LSR-A to the LSR-D. To be more specific, the same label value "L1" is assigned to the links between all the LSRs contained in the connection (LSP) described above, and the label value set in a packet (a data block) forwarded across this connection is "L1" on every link.

With this label value setting, as shown in FIG. 1B, even when the packet forwarding cuts through (shortcut), e.g., the LSR-B due to a change in routing on the connection with the result that a neighboring relationship between the LSRs changes (the LSR-A is connected directly to the LSR-C by the link), the LSR-C is capable of receiving the labeled packet having the label value "L1" from the LSR-A. Then, if the LSR-C executes the same process as before shortcutting the router to forward the packet received from the LSR-A, the packet can be forwarded to the LSR-D from the LSR-A.

Thus, the LSR-A defined as a neighboring node to the shortcut LSR-B in the receiving direction and the LSR-C defined as a neighboring node in the transmitting direction, are capable of properly transferring the packet to the LSR-D even by executing the same process as before the shortcut has been done. Hence, the protocol process for the label reassignment after the shortcut as explained in the prior art, is not required. Accordingly, it does not happen that the communication gets intermittent (interrupted) after the shortcut.

If the same label (having the same label value) is assigned before and after the node as a shortcut target according to the present invention, it is possible to obviate the problems (A) and (B) inherent in the prior art. Namely, the process of the label assignment required with the shortcut is not needed, and hence there is no rise in load upon the protocol process that is attributed to the shortcut. Further, there is no such problem that the communication is interrupted till the label assignment is completed if the shortcut is effected as seen in the prior art.

Note that the discussion herein, for an explanatory convenience, has been made by exemplifying the network in which the optical path is on the lower-order layer while the MPLS is on the higher-order layer, however, the present invention can be applied to an MPLS network in which the LSPs are hierarchized by label stacking. Moreover, the present invention is also applicable to other connection-oriented communication networks (irrespective of the categories and the number of layers).

Figure 2A:
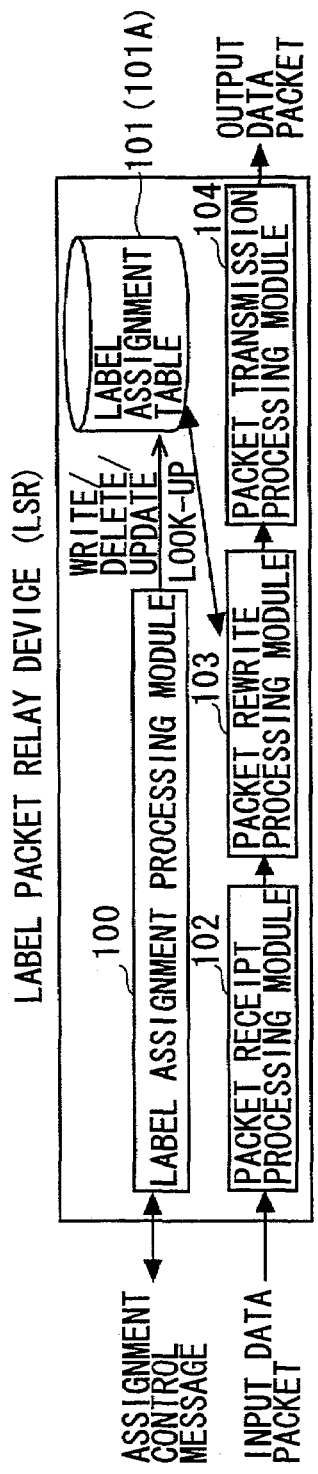
FIG. 2A is a block diagram showing a node according to the present invention.
Figure 2B:
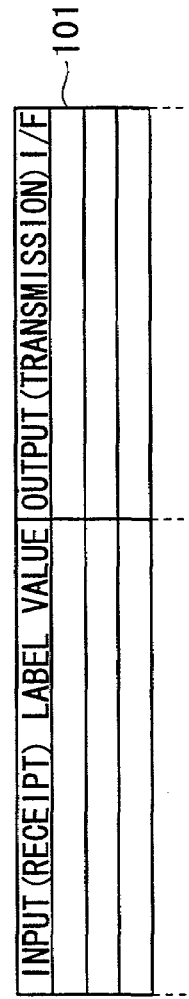
FIGS. 2B and 2C are diagrams each showing a label assignment table.
Figure 2C:
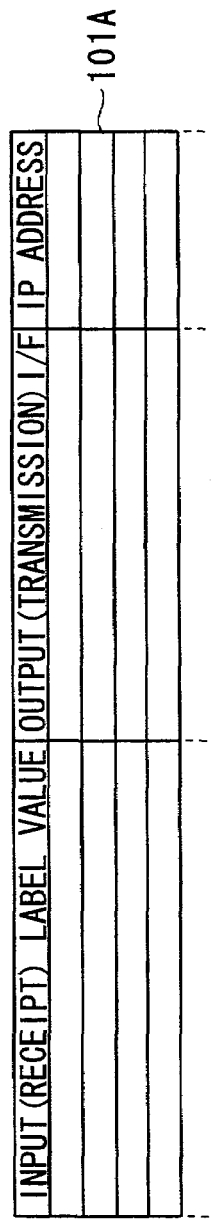

FIGS. 2A, 2B and 2C are a block diagram and label assignment tables. FIG. 2A shows an example of the node applied to the present invention, wherein the LSR serving as a node includes a label assignment processing module 100, a label assignment table 101, a packet receipt processing module 102, a packet rewrite processing module 103 and a packet forwarding processing module 104.

The label assignment processing module 100 assigns a label value that is the same at an ingress (input) and at an egress (output) to each of the nodes contained in one single connection (LSP). For example, if a certain LSP extends across four pieces of nodes and three links that connect these nodes to each other, the label assignment processing module 100 writes in a label assignment table 101 a label value used the same across the respective links.

The label assignment table 101 is, as shown in FIG. 2B, structured to have at least one entry containing an input label value and output interface (I/F) identifying information. The label assignment table 101 is used for searching for a piece of output I/F identifying information with an input label value used as a key, and reading the same output I/F identifying information mapped to this key.

Further, the packet arriving at the LSR is received by the packet receipt processing module 102 and sent to the packet rewrite processing module 103. The packet rewrite processing module 103 refers to the label assignment table 101, and obtains the output I/F mapped (corresponding) to the label value (the input label value: a receipt label value) attached to the packet. At this time, the packet rewrite processing module 103, if the label value attached to the packet exists in the label assignment table 101, reads the output I/F identifying information stored as one element of the mapping to this label value. Thereafter, the packet rewrite processing module 103 rewrites pieces of information such as a hop count contained in the packet and then sends the packet together with the identifying information to the packet forwarding processing module 104. The packet forwarding processing module 104 forwards the packet from the output I/F identified by the identifying information obtained by the packet rewrite processing module 103. The thus transmitted packet is forwarded to a next LSR via the link.

Thus, the label value attached to the packet is sent without being rewritten in the LSR. Accordingly, the label value attached to the packet forwarded across the LSRs is the same at the ingress (when receiving the packet) of the LSPs and at the egress (when transmitting the packet) of the LSRs. Namely, the label (input label) on the ingress (input: receipt) side and the egress (output: transmission) side of the LSP containing the LSRS, have the same label value.

A network administrator, a network management system, a neighboring node etc notify of the label value assigned to the LSP by an "assignment control message" that will be explained later on.

First Embodiment

<Example of Network Architecture>

Figure 3A:
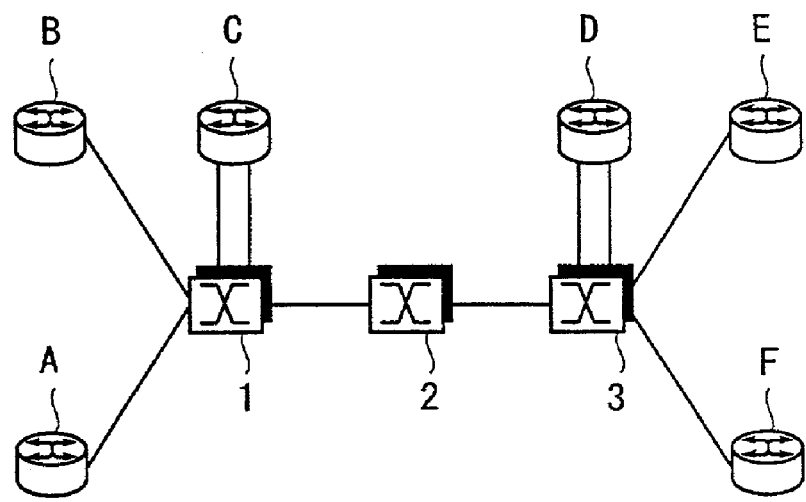
FIG. 3A is a diagram showing an example of a network architecture in a first embodiment.
Figure 3B:
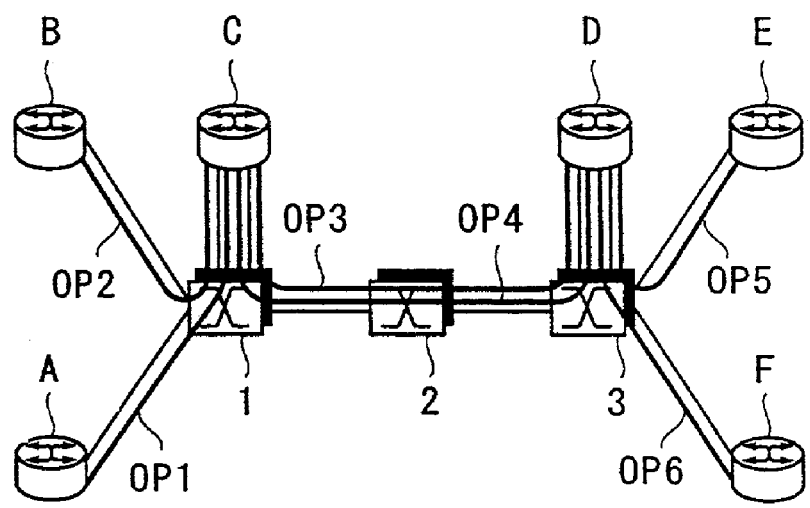
FIG. 3B is a diagram showing an initial topology of the network.

FIGS. 3 and 4 are diagrams each showing an example of the architecture of the connection-oriented communication network in a first embodiment of the present invention. What is herein considered is, as shown in FIG. 3A, an example where a plurality of LSRs-A, B, C, D, E and F are connected via OXCs-1, 2 and 3. At a first-tiered level (a lower-order layer: an optical wavelength network), six lengths of optical paths OP1 to OP6 for connecting the LSRs are established as shown in FIG. 3B. This connection state is set as an initial topology.

Figures 4A, 4B:
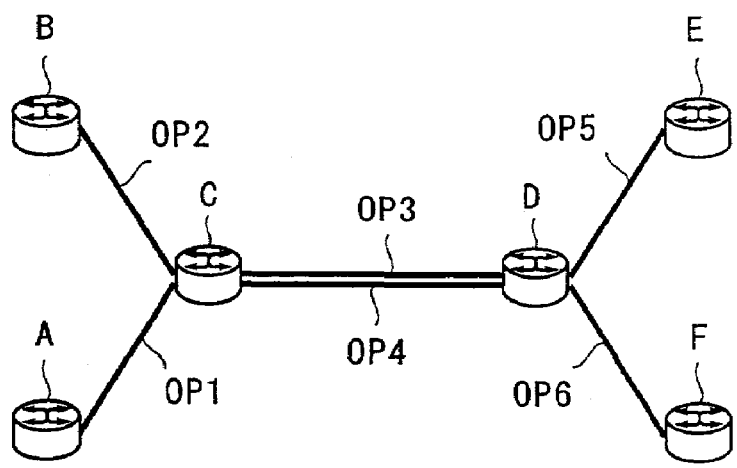
FIG. 4B is a diagram showing a state of logical connections between the LSRs.

As a second higher-order layer (a higher-order layer: an MPLS network (label switching network)) than the first layer, MPLS-tiered connection (LSP (Label Switch Path)) can be connected between arbitrary LSRs by utilizing the first-tiered optical paths OP1 through OP6 as second-tiered links that have already been established in the initial topology. It is herein assumed that the LSP be established as particularized in, e.g., a Table 1 shown in FIG. 4A. FIG. 4B is a diagram showing the logical inter-LSR topology in the case of establishing the connections LSP1 through LSP5 in accordance with the Table 1.

<Outline of Label Assignment Method>

When the connections LSP1 through LSP5 are established based on the Table 1 shown in FIG. 4A, label values used between the LSRs are assigned to the respective connections LSP1 through LSP5. According to MPLS, the label value indicates a value set in a 20-bit shim-header defined by MPLS.

Each of the nodes (LSRs) in the first embodiment has the same architecture as that shown in FIG. 2A. The label assignment processing module 100 shown in FIG. 2A assigns the same label value to the same LSP on both of its ingress and egress sides.

For example, the label assignment processing module 100 provided in each of the LSRs-A, B, C, D and E contained in the connection LSP1 assigns a label value "5" to the connection LSP1 so that the same label value "5" can be used between the LSR-A and the LSR-C, between the LSR-C and the LSR-D, and between the LSR-D and the LSR-E.

Namely, the label assignment processing module 100 in each of the LSRs-A, B, C, D and E writes, in the label assignment table 101, the label value "5" as an input label value in an entry corresponding to the connection LSP1.

The label assignment table 101 is, as shown in FIG. 2B, structured to have entries containing the input label values and the output I/Fs, and is used for searching for the output I/F identifying information with the input label value used as the key and determining the same output I/F identifying information corresponding to this key.

The data packet arriving at the LSR is received by the packet receipt processing module 102 and sent to the packet rewrite processing module 103. The packet rewrite processing module 103 obtains the output I/F mapped to the input label value by referring to the label assignment table 101. If the input label value exists in the table 101, the packet rewrite processing module 103 rewrites pieces of information such as a hop count that are padded to the packet, and thereafter the packet forwarding processing module 104 outputs the packet to the output I/F searched from the label assignment table 101. As a result, the same value as the input label value is outputted.

By the way, the nodes configuring the MPLS network are categorized into edge nodes and core nodes. The edge node is connected to other network and functions as an ingress or egress node in the MPLS network. The edge node has a function (a gateway function of the MPLS network with respect to other network) of attaching and removing the label to and from the data packet, and a function (a label switching function) of outputting (switching a route of) the packet to the corresponding output I/F in accordance with the label attached to the packet. The core node having the label switching function switches the route of the packet received from the edge node or other core node in accordance with the label.

When the LSR functions as the edge node, the LSR actualizes the gateway function in the following manner. For example, the edge node receives the packet from other network. The packet forwarded from other network is not labeled. Therefore, the LSR functioning as the edge node refers to header information contained in the packet and determines a label to be attached to the packet on the basis of this piece of header information by searching the label assignment table.

To be specific, the edge node (LSR), if connected, for instance, to an IP network as other network, includes a label assignment table 101A (see FIG. 2C) having entries containing mappings between IP addresses or network addresses and label values.

If this edge node functions as the ingress router in the MPLS network, the packet receipt processing module 102 receives an IP packet from the IP network, and then the packet rewrite processing module 103 refers to a destination IP address written in the header of the IP packet and searches for an entry containing the label value mapped to the destination IP address from the label assignment table 101A.

The packet rewrite processing module 103, when hitting the entry corresponding to the destination IP address, determines a label value mapped to the IP address that is described in that entry as a label value attached to the IP packet, and attaches this label value to the IP packet. Thereafter, the IP packet is transferred to the packet forwarding processing module 104 and forwarded from the output I/F mapped to the label value toward other LSR.

Therefore, a preferable data structure is that the entry in the label assignment table 101A further contains a piece of identifying information of the output I/F mapped to the label value in order for the packet rewrite processing module 103 to obtain the output I/F identifying information together with the label value.

On the other hand, if the edge node functions as an egress router in the MPLS network, when the packet receipt processing module 102 receives the packet that should be forwarded to other network (the IP network), the packet rewrite processing module 103 removes the label from the packet and terminals the MPLS network. Thereafter, the packet forwarding processing module 104 forwards the packet from the output I/F mapped to the destination IP address of the packet.

<Method of Notifying Each Node of Label Value>

Next, a method of notifying the respective LSRs (nodes) configuring the LSP (the connection of the higher-order layer) of the same label value, will be explained. As described above, the label assignment processing module 100 generates the entries on the label assignment tables 101 (101A).

The label assignment processing module 100 reflects the label attached to the input packet and the label attached to the output packet in the label assignment table 101 (101A), this reflecting process being triggered by an assignment control message announced from within the LDR or received from outside the LSR.

Namely, the label assignment processing module 100 previously has a plurality of label values used for creating the entries. The assignment control message contains the label values assigned to the LSPs. The label assignment processing module 100, upon receiving the assignment control message, determines the label value as an input label value that is contained in this assignment control message, then creates an entry containing the determined input label value, and writes the created entry in the label assignment table 100 (101A).

A method of transferring the assignment control message from the outside may involve the use of, for example, the following methods.

(i) The network administrator manually determines the label value assigned to the LSP (all the links (optical paths) included in the LSP), and notifies each LSR of the assignment control message containing the thus determined label value by making use of Telnet (a protocol operating over TCP/IP networks) and so on.

Figure 5A:
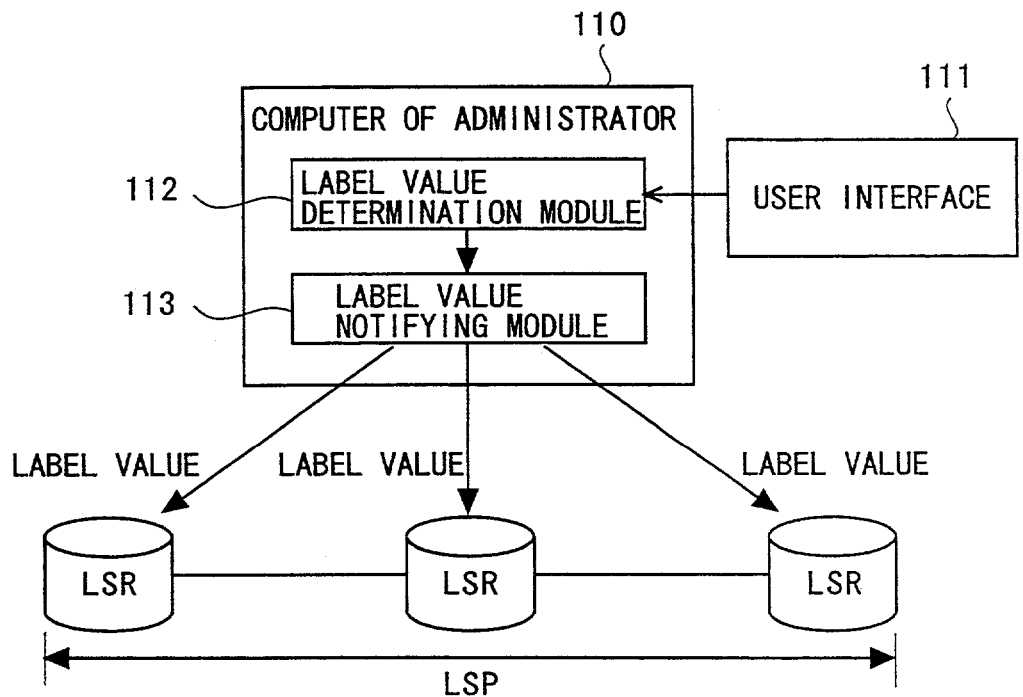
FIGS. 5A and 5B are explanatory diagrams showing a label value notifying method.

That is, as shown in FIG. 5A, the network administrator, when establishing the connection (LSP), operates a computer 110 in order to notify of the label value assigned to this LSP.

The computer 110 is connected to at least the LSRs that the establishing target LSP extends across via the communication lines. The network administrator operates the computer 110 by use of a user interface 111 (including input and output devices) connected to the computer 110. The computer 110 executes a program and thereby functions as a label value determination module 112 (corresponding to a determination module according to the present invention) and a label value-notifying module 113 (corresponding to a notifying module according to the present invention).

The determination module 112 provides the administrator with various items of data for establishing the LSP through the user interface 111, and accepts the label value assigned to the LSP, which has been inputted by the administrator through the user interface 111. The determination module 112 transfersthe accepted label value as the label value assigned to the LSP to the notifying module 113. The notifying module 113 generates the assignment control message (based on Telnet) containing the label value, and transmits this message to the respective LSRs (the LSRs illustrated as three routers in FIG. 4A) configuring the LSP. Each of the LSRs is thereby notified of the same label value assigned to all the links configuring the LSP.

(ii) A server such as an NMS (Network Management System) for managing the network resources in concentration (the NMS is connected to all the LSRs in the MPLS network via a control network), automatically determines the label value assigned to the LSP, and notifies the respective LSRs of a control message as the assignment control message containing the determined label value.

Figure 5B:
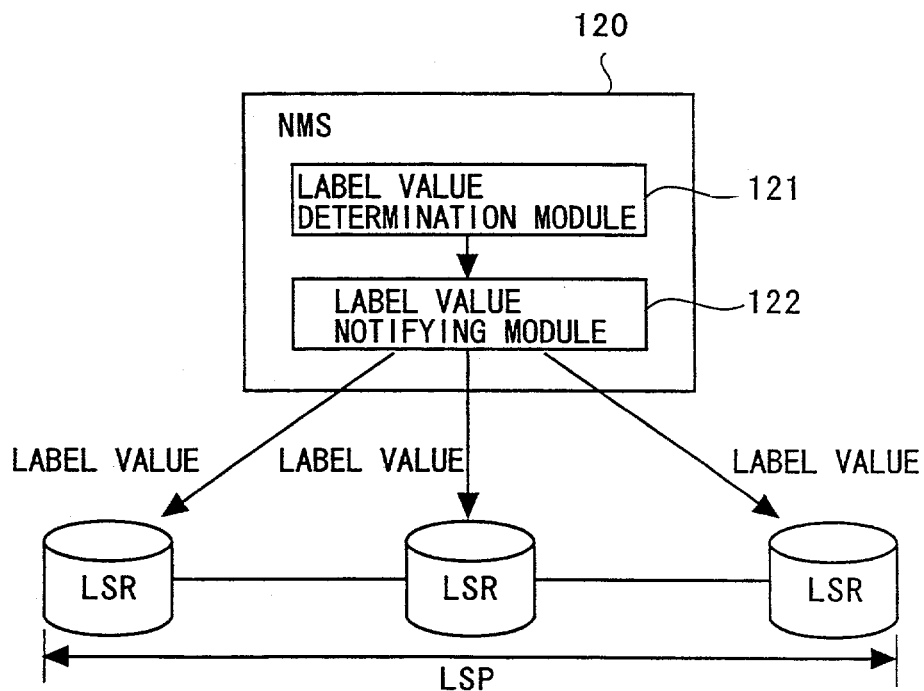

To be specific, as shown in FIG. 5B, an NMS 120 managing and controlling the LSRs within the MPLS network is provided. The NMS 120 includes a determination module 121 (corresponding to the determination module according to the present invention) for determining the label value assigned to the LSP when establishing this LSP, and a notifying module 122 (corresponding to the notifying module according to the present invention) for generating the assignment control message containing the determined label value and notifying of the same message the LSRs (illustrated as three routers in FIG. 4B) configuring the LSP.

The NMS 120 implements software for actualizing the determination module 121 and the notifying module 122, and the processes by the determination module 121 and the notifying module 122 are automatically executed by the NMS 120.

(iii) Any one of the LSRs determines the label value assigned to the LSP, then pads the label value into the message used based on the protocol such as LDP (Label Distribution Protocol) utilized for determining the label assignment between the LSRs, and notifies other LSRs of this massage as the assignment control message.

Figure 6A:
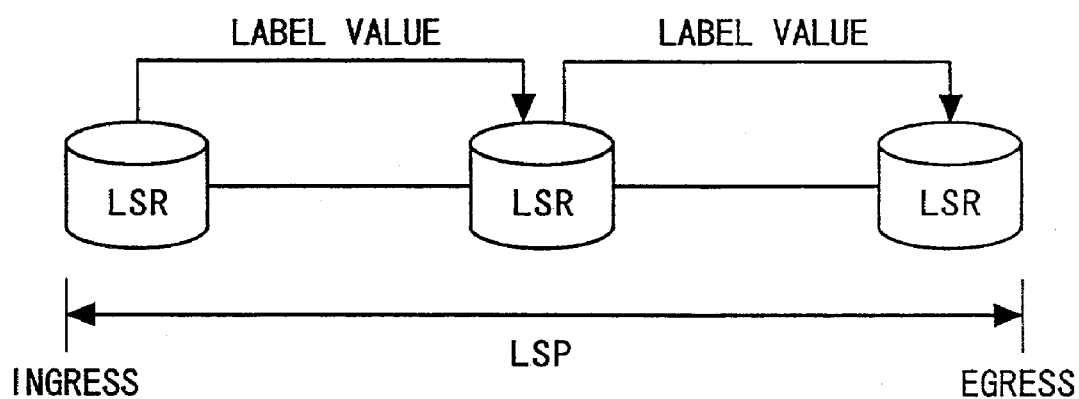
FIGS. 6A and 6B are explanatory diagrams showing a label value notifying method.
Figure 6B:
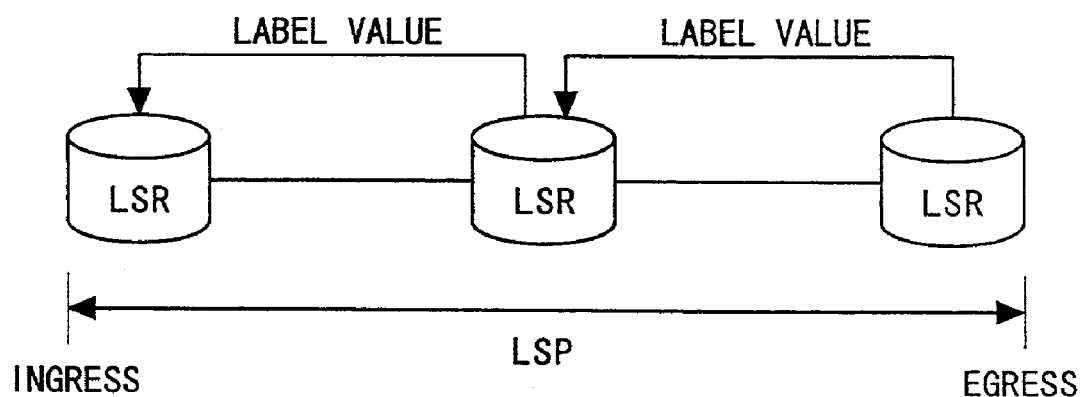

Namely, as shown in FIGS. 6A and 6B, among the LSRs (exemplified as three routers in FIGS. 6A and 6B) that the establishing target LSP extends across, for instance, an ingress LSR (disposed at the left end in FIG. 6A) at the ingress of the LSP or an egress LSP (disposed the right end in FIG. 6B) at the egress of the LSP determines the label value assigned to the LSP, and notifies of the label value by sending the assignment control message containing this label value to other LSRs.

When LDP is applied, a label request message (which may be defined as a path (connection) setting request) or a label-mapping message (which maybe defined as a label assignment (mapping)request)is used as the assignment control message.

By the way, if the methods (i) and (ii) are adopted, the label assignment processing module 100 of each of the LSRs configuring the LSP simply controls the entries in the table 101 (101A) as the administrator (the computer 110) or the NMS 120 indicates. That is, each of LSRs simply generates the entry including the label value contained in the assignment control message, and writes the generated entry in the label assignment table 101 (101A). By contrast, if the method (iii) is adopted, the label assignment processing module 100 has the function (as the determination module and the notifying module according to the present invention) of autonomously determining the label value as will hereinafter be explained.

<Label Value Autonomous Determination Method in Each Node>

There is a case where a plurality of connections (LSPs) established in the MPLS network might extend across the same LSRs. In this case, a link (optical path) between the LSRs is called a "shared link".

It is required that different label values be assigned to the respective connections on the shared link. For instance, in the example shown in FIGS. 4A and 4B, the link (the optical path OP3) that connects the LSR-C to the LSR-D may be defined as the shared link with respect to the connections LSP1 through LSP4. In this case, the different label values must be assigned to the respective connections LSP1 through LSP4 on the shared link between the LSR-C and the LSR-D.

By contrast, if there is the plurality of LSPs including no shared link, the same label value can be assigned to these LSPs. In such a case, the respective LSRs learn all the LSPs and their routes extending across the MPLS network, and may assign the same label value to the LSPs. Alternatively, as described above, the administrator or the NMS may assign the same label value to the plurality of LSPs. A method of detecting the LSPs including no shared link may be, for example, an algorithm of seeking the label values assigned to the existing LSPs using only the links excluding routes of LSPs that are established afresh.

What is considered herein is a method by which the node (for executing a process of determining the label value, this node being referred to as a [label value determination node]) for starting the label assignment to the LSPs acquires a label value that is unique in the MLPS network by using the following algorithms. According to the MPLS, generally the LSR (edgenode) disposed at the ingress or egress of the MPLS network (LSPs) functions as the label value determination node.

The label value determination node needs to assign the same label value to all the links within a certain LSP and assign different (unduplicated)label values to other LSPs having a shared link with respect to this LSP.

An architecture for the label value determination node to know beforehand the label values, which can be assigned on all the links that the LSP extends across, is required in order for the label value determination node to assign the unique label to the LSP. This architecture can be actualized by, e.g., the following algorithms.

(A) Usable label values are previously given to the LSR functioning as the label value determination node. The network administrator or the management system such as the NMS allocates number spaces unduplicated with other LSRs as label values usable by each label value determination node. Each label value determination node is given (notified of) the allocated number spaces by the assignment control message and so on. The usable number spaces are stored in the label assignment processing module 100 and properly reflected in the label assignment table 101 (101A).

A method of allocating the number spaces may involve applying, e.g., the following algorithms.

(A1) Label values of "0" through "099" are allocated to the LSR-A, and label values of "1000" through "1999" are allocated to the LSR-B, thus allocating the consecutive number spaces to the respective LSRs.

(A2) A number space that is not consecutive but unique is allocated by utilizing a Hash function such as "L mod x", where "L" is the total number of labels, and "x" is the total number of routers LSRs. For instance, if ten pieces of routers LSRs exist in the MPLS network, the LSR-A uses a number space such as "0, 10, 20, . . . ", and the LSR-B uses a number space such as "1, 11, 21, . . . ".

(B) Each of the LSRs autonomously makes the use of some proportions of label values that contain identifiers of the LSRs functioning as the label value determination nodes (each of the LSRs configuring the LSP receives data for generating the label value and generates the label value by use of this set of label value generation data).

According to the MPLS, the number space (a label value storage field; shim header) has 20 bits. Therefore, 20 bits are divided into high-order bits and low-order bits, and, for example, if the high-order bits are allocated as a value assigned locally between the LSRs (identification numbers of the LSRs), this allocation can prevent other LSRs to use the same values.

Figures 7A, 7B:
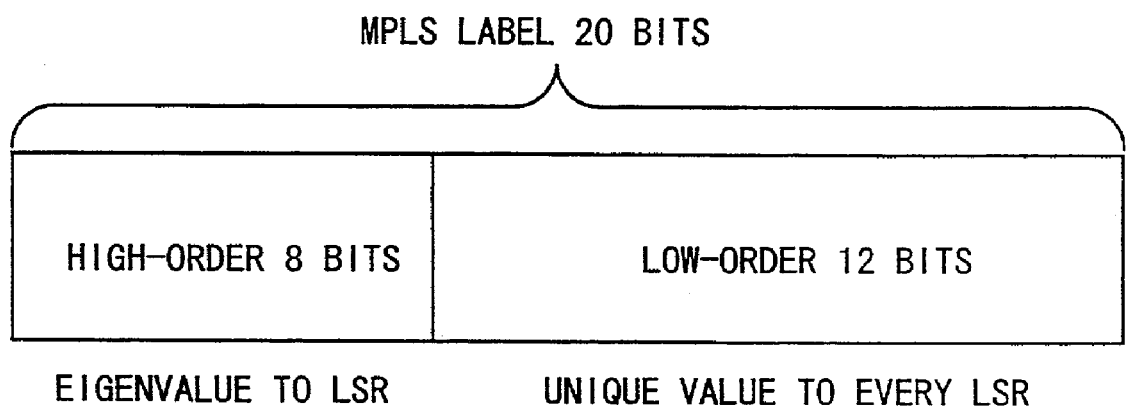
FIG. 7A is an explanatory diagram showing a method by which the LSR autonomously assigns a label value.
FIG. 7B is a table showing the label values assigned to the LSPs.

For instance, as shown in FIG. 7(A), when each of the LSRs establishes the connection (LSP), the identification numbers (e.g., the LSR-A is "1", and the LSR-B is "2") of the LSRs serving as the label value determination nodes are set in the high-order bits (e.g., 8 bits) of the number space, and numbers (values unique to the respective LSRs) each incremented (changed) each time the connection is established are set in the low-order bits (e.g., 12 bits). With this setting, the label value can be invariably uniquely determined within the network. Thus, the identification number of the LSR allocated to the high-order bits of the number space is used as the data for generating the label values.

For example, addresses on other layer such as IP addresses possessed by the LSR can be used as the identification number of the LSR (LSR identifier). Alternatively, the LSR identifiers generated based on the Hash function by the network administrator or the NMS may be allocated (announced) to the respective LSRs. The LSR identifier and the value unique to every LSR are stored in the label assignment processing module 100 of each LSR, and are properly reflected in the label assignment table 101 (101A).

Further, the label assignment processing module 100 of the edge node (the ingress (start) or egress (end) node) may retain the LSR identifiers and the values each unique to every LSR, then generate the label values by combining these values, and notify each on-LSP LSR of the thus generated label value. Alternatively, the edge node may notify each on-LSP LSR of its own LSR identifier as data for operation, and each LSR may retain the value unique to every LSR, generate the label value by combining the notified LSR indentifier with the unique value and reflect the label value in the label assignment table 101 (101A).

In the example shown in FIGS. 3 and 4, as shown in Table 2 in FIG. 7B, for instance, if the LSR-A serving as the ingress node of the connection LSP1 as well as being the label value determination node assigns the label values to the LSRs-A, C, D and E, the label assignment processing module 100 of the LSR-A executes processes that follow.

Namely, the label assignment processing module 100 at first extracts its own LSR identifier "1" stored beforehand as a value of the high-order bit (among 8 bits) of the label value. Next, the label assignment processing module 100 determines values used as the low-order bits from the values each unique to each of the plurality of LSRS, which are previously retained by the label assignment processing module 100 itself. Values that can be taken as the unique values are "0" through "N", wherein "0" is the initial value, and the value is incremented by 1 each time the connection with the LSR-A serving as the ingress node is established.

Herein, the connection LSP1 is the first LSP with the LSR-A serving as the ingress (start) node, and therefore the label assignment processing module 100 acquires an unique value "0" (among 12 bits) as the low-order bit and combines it with the high-order bit "1". A label value "10" (of which the high-order bit is "1" and the low-order bit is "0") is thus generated. This label value "10" is determined as the label value assigned to the connection LSP1.

Thereafter, the label assignment processing module 100 of the LSR-A notifies each of the LSRs-C, D and E of the label value "10" (which corresponds to a notifying module according to the present invention). Each of the LSRs-C, D and E is notified of the data for generating the label value in such a way that the same data are contained in the assignment control message. The label assignment processing module 100 of each of the LSR-A, C, D and E, upon receiving the label value "10", creates an entry containing this label value "10", and writes this entry in the label assignment table 101 (101A) (see FIG. 2B). The label value "10" is used as an input label value and an output label value.

Thereafter, if the LSR-A assigns the label value to the connection LSP2, the label assignment processing module 100 of the LSR-A generates and determines the label value by the same algorithm as that described above. In this case, the connection LSP2 is the second LSP with the LSR-A serving as the ingress (start) node, and hence the label assignment processing module 100 obtains "1" as the low-order bit. A label value "11" (of which the high-order bit is "1", and the low-order bit is "1") is thus generated, and each of the LSRs-C, D and F is notified of this label value. Then, the label assignment processing module 100 of each of the LSRs-A, C, D and F reflects the label value in the label assignment table 101 (101A).

<Methods of Notifying Each Node of Assigned Label Value>

The following methods can be applied if the edge node disposed at the ingress or the egress functions as the label value determination node, and notifies each of the LSRs that the connection extends across, of the label value assigned to this connection.

A method (1) involves the use of a label assignment protocol used as a standard protocol in MPLS. The label assignment protocol includes, e.g., LDP (Label Distribution Protocol) and RSVP (Resource Reservation Protocol), wherein the label value is switched between the nodes.

A method (2) is to notify of the label value by use of a protocol into which a routing protocol such as OSPF (Open Shortest Path First), BGP (Border Gateway Protocol) and others is expanded for the label assignment.

A method (3) is a method by which a server (e.g., the NMS) having a function of performing predetermined settings in the respective nodes on the connection on the basis of the protocol such as Telnet notifies each LSR of the label assignment data (label value).

For example, when LDP exemplified for the method (1) is utilized, there is used the label request message (path setting request) that has hitherto been used for establishing the connection (LSP). The start node (ingress LSR) on the LSP notifies the end node (egress LSR) of the label request message via the LSRs that this LSP extends across.

The egress LSR, upon receiving the label request message, determines the label value assigned to the establishing target LSP, and thereafter assigns the same label value to the connection extending from the egress router up to the ingress router by use of the label mapping message that has hitherto been used according to LDP.

Namely, the label assignment processing module 100 of the egress LSR assigns to the LSP the label value that is unique in the MPLS network, and generates and transmits the label mapping message containing the label value assigned thereto. Further, the label assignment processing module 100 of the egress LSR reflects this label value in the label assignment table 101A.

The notification of the label-mapping message goes in the opposite direction on the route along which to notify of the label request message. The label assignment processing module 100 of each LSR, when receiving the label mapping message, obtains the label value contained in this message as the label value assigned to the establishing target LSP, and reflects this label value in the label assignment table 101.

Figure 8:
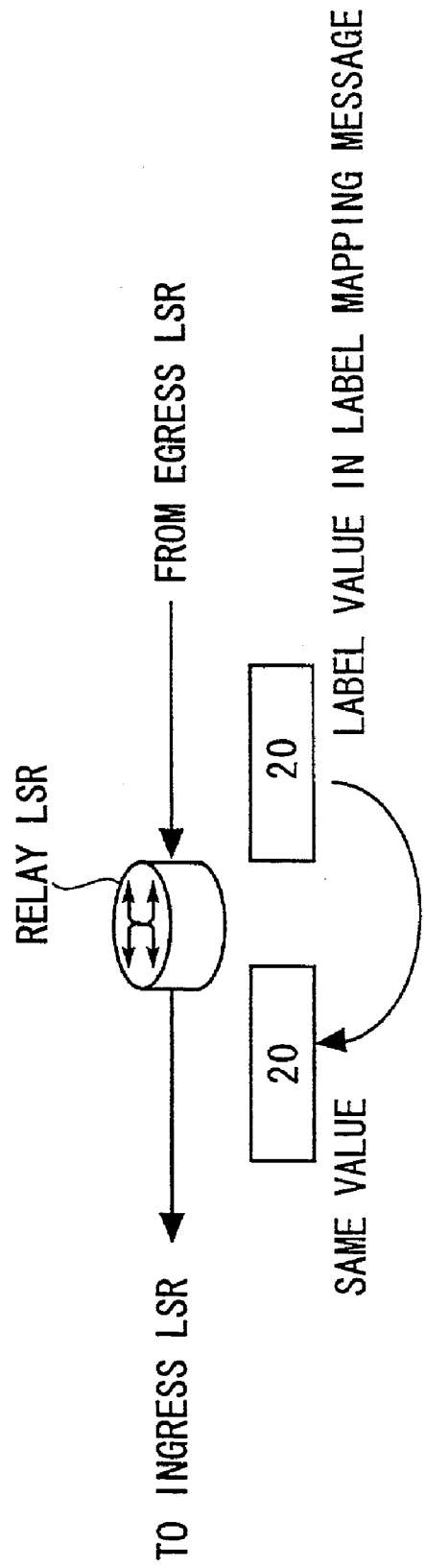
FIG. 8 is a diagram showing an example of assigning the same label value to respective links configuring a certain LSP by use of LDP.

In this case, the label assignment processing module 100 of the LSR does not change the label value (assigned by the egress LSR) contained in the label mapping message received, and sends to the next node (LSR) the label mapping message containing the same label value as the value when received (see FIG. 8).

The example given above is that the egress LSR assigns the label value, however, the ingress LSR may also assign the label value and notify the on-LSP LSR of the assigned label value by using the label request message etc.

Moreover, even when a protocol other than LDP is utilized, each of the LSRs on the LSP is notified of the message containing the label value in the same way as the above. In this case, the node (LSR) for relaying the message does not change the once-assigned label value (contained in the message received) whereby the same label value is assigned to all the links configuring the LSP.

The message based on the protocol utilized for notifying of the label value is received as the above-mentioned [assignment control message] by a certain node and processed by the label assignment processing module 100, and the label value contained in this message is reflected in the label assignment table 100 or 101A.

<Operational Example After Label Assignment>

Next, an example of operation after each of the LSRs on the LSP has been notified of the label value and this label value has been reflected in the label assignment table 101 or 101A, will be explained. What is herein considered is, for instance, a case where a traffic from the LSR-B toward the LSR-E increases in the MPLS network shown in FIGS. 3 and 4, the LSR-C comes to have a heavy packet processing load, then an average delay elongates, and there arises a necessity of bypassing the LSR-C.

In the case of bypassing the LSR-C, for example, the OXC-1 outputs the input light from the OP2 to an egress port of the OP3 without outputting the same input light to the LSR-C, thereby generating a shortcut path designated by OP7. As a result, the label packet forwarded from the LSR-B arrives directly at the LSR-D without via the LSR-C.

Figure 9:
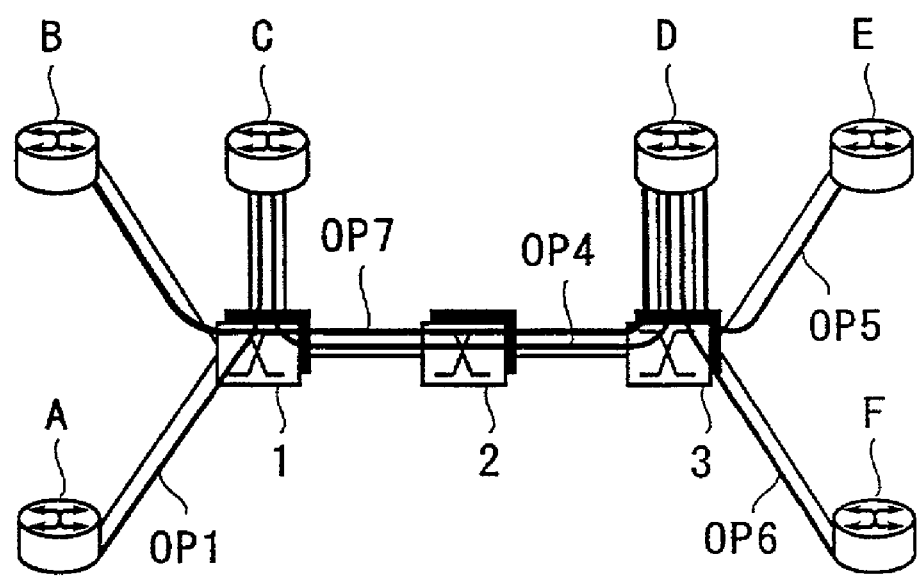
FIG. 9 is a diagram showing a state after a shortcut is carried out.
Figure 9:
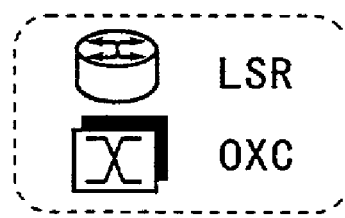

Herein, as shown in Table 2 in FIG. 7B, the packets addressed to the LSR-E and LSR-F establishing their connections from the LSR-B are forwarded thereto via the LSP3 and the LSP4. The LSPs 3 and 4 are respectively given the same label values "20" and "0" on the links configuring the LSPs 3 and 4. Therefore, the LSR-D may execute, even when the LSR-C is shortcut, the packet in the same way as before the shortcut (see FIG. 9).

Thus, even in the case of making such a route change that the high-order node (LSR) is shortcut with respect to the route of the optical path defined as the low-order layer under the MPLS, there isno influence (such as a change in the I/O interface, a change in the label value, and soon) upon the packet processing by the high-order LSR, and the low-order path can be controlled with no constraint.

The discussion in the example given above has been focused on the case where the shortcut is carried out when the LSR-C comes to have the heavy packet-processing load and the average delay elongates. The execution of the shortcut is not, however, limited to the case described above. For example, the shortcut may be performed in a case where a trouble occurs in the LSR-C with the result that the packet cannot be transferred, or a case where there arises a necessity of bypassing the LSR-C for a convenience of the network management.

Second Embodiment

Next, a second embodiment of the present invention will be described. The second embodiment, which will hereinafter be discussed, is an embodiment for providing a compatibility with the conventional system by mixing the method of assigning the same label value to all the node-to-node links configuring the connection as exemplified in the first embodiment with the conventional method of making the label value for identifying the connection different on the node-to-node links.

<Example of Network Architecture>

The discussion in the second embodiment will be made, as in the first embodiment, by exemplifying the network having the architecture shown in FIGS. 3 and 4 as the initial topology.

<Example of Existing Label Assignment Method>

As shown in FIG. 4A, if the LSPs1–5 are established, it is required that the label values used between the LSRs be assigned to the respective LSPs1–5. For instance, according to the conventional MPLS, the label value is a value entered in the 20-bit shim header defined by the MPLS. This label value can be determined locally on the link between the neighboring LSRs by the label assignment module (the label assignment processing module 100) provided in the LSR. Further, if the LSP extends across a plurality of LSRS, the values each different on every link can be used.

When utilizing the conventional label assignment method, an MPLS label value specifying a certain LSP is different on each of the links configuring this LSP. For instance, with respect to the LSP1, a label value "5" is assigned to the link between the LSR-A and LSR-C, a label value "10" is assigned to the link between the LSR-C and LSR-D, and a label value "6" is assigned to the link between the LSR-D and LSR-E.

Each of the LSRs-A, C, D and E, when receiving a label value assignment message from the network administrator or the NMS or the neighboring LSR, converts the label value contained in this message and notifies the next LSR of this converted label value. For example, the LSR-C, when receiving the message containing the label value "5" from the LSR-A, converts the label value "5" contained in the message into "10" and transmits the label value "10" to the LSR-D. The LSR-D converts the label value "10" contained in the message into "6" and transmits "6" to the LSR-E as the LSR-D does.

<Outline of Label Assignment Method>

According to the present invention, unlike the conventional method, the label assignment processing modules 100 provided in the LSRs (nodes), as described above, assign the same label value at the ingress node and at the egress node on the same LSP.

For example, with respect to the LSP1, the label assignment processing module 100 writes in the label assignment table such an entry that the same label value "5" can be assigned to the links between the LSR-A and the LSR-C, between the LSR-C and the LSR-D and between the LSR-D and the LSR-E. In the entry written at this time, the output label is the same as the input label, and hence the label value rewriting based on this entry does not occur. According to the second embodiment, especially the entry in this category is called a "non-rewrite entry", which implies a difference from the "rewrite entry" for carrying out the conventional method, wherein the input and output labels are given the label values different from each other.

The rewrite entry generally consists of a receipt label, a receipt I/F, a transmission label and a transmission I/F. By contrast, the non-rewrite entry is an entry containing the "receipt label" and the "transmission I/F" shown in the first embodiment.

Figure 10A:
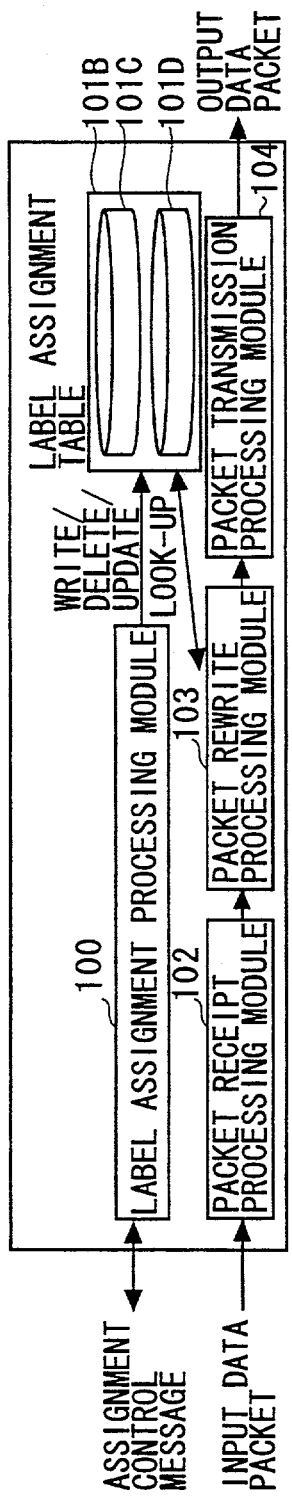
FIG. 10A is a diagram showing one mode of the architecture of the node in a second embodiment.
Figure 10B:
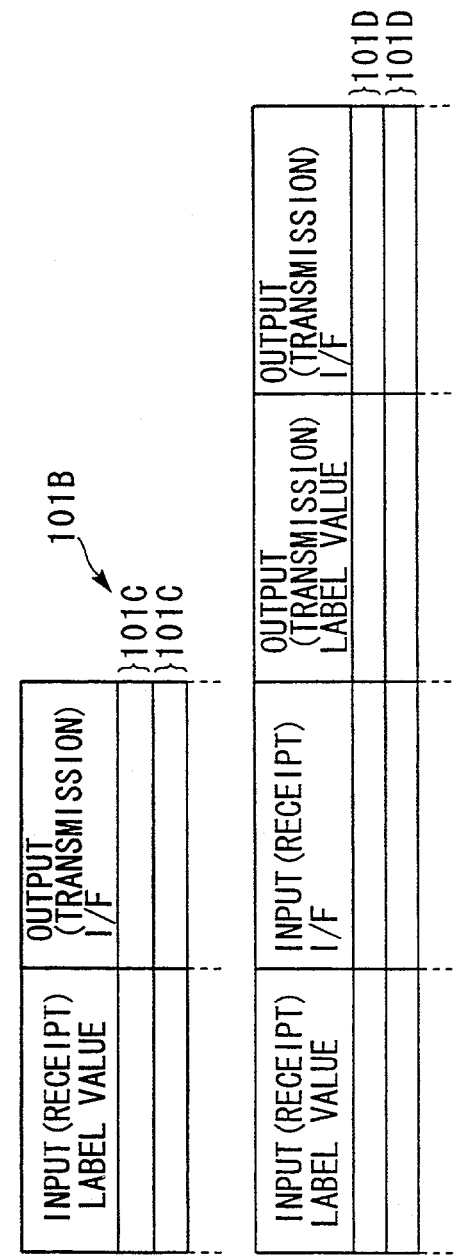
FIG. 10B is a diagram showing a label assignment table.

FIGS. 10A and 10B are diagrams showing an example of an architecture of the high-order node (LSR) in the second embodiment, and an example of a data structure of a label assignment table 101B thereof. According to the second embodiment, the LSR has the label assignment table 101B containing a non-rewrite entry 101C used for carrying out the method of the present invention and a write entry 101D used for carrying out the conventional method. Further, a label assignment processing module 100A in the second embodiment executes the processes for carrying out both of the method of the present invention and the conventional method.

The LSR in the second embodiment operates to process the data packet in the following manner. To be specific, the data packet arriving at the LSR is received by the packet receipt processing module 102 and sent to the packet rewrite processing module 103.

The packet rewrite processing module 103 searches for an output I/F mapped to an input label value by referring to the label. Namely, if the input label value is contained in the rewrite entry 101D, the packet rewrite processing module 103 reads an output label value corresponding to this input label value from the rewrite entry 101D, and rewrites the label value (input label value) attached to the packet into an output label value. Further, the packet rewrite processing module 103 reads a piece of identifying information of the output I/F mapped to the input label value and sends the output I/F identifying information together with the data packet to the packet forwarding processing module 104. While on the other hand, if the input label value is contained in the non-rewrite entry 101C, the input label value becomes the output label value as it is. In this case, the packet rewrite processing module 103 extracts the output I/F mapped to the input label value from the non-rewrite entry 101C, and sends it together with the data packet to the packet forwarding-processing module 104. The packet forwarding processing module 104 forwards the packet to the output I/F identified by the identifying information on the basis of this piece of output I/F identifying information sent from the packet rewrite processing module 103.

Thus, the label assignment table 101B contains the two categories of entries, i.e., the rewrite entry 101D and the non-rewrite entry 101C, whereby the label value used for the shortcut can be applied to the same connection in a way that keeps the compatibility with the conventional MPLS.

<Method of Notifying Each Node of Assigned Label Value>

Any methods explained in the first embodiment can be applied to a method of determining the label value to be assigned to the connection (LSP) and a method of notifying each of the on-the-connection nodes (LSRs) of the determined label value.

Namely, there may be used the standard label assignment protocol used in the MPLS such as LDP (Label Distribution protocol) and RSVP (Resource Reservation Protocol) for switching the label values between the nodes. Moreover, there may also be used the protocol into which the routing protocol such as OSPF (Open Shortest Path First), BGP (Border Gateway Protocol) and others is expanded for the label assignment. Alternatively, the server having the function of performing the settings in the nodes may set the label assignment data for every node across the network on the basis of the protocol such as Telnet.

By the way, in the case of utilizing LDP for the conventional label assignment method, the conventional label request message is used, and the path-setting request is transferred from the ingress LSR towards the egress LSR. Thereafter, the label-mapping message is sent from the egress LSR towards the ingress LSR via the respective LSRs on the LSP. In this case, each of the LSRs, when receiving the label-mapping message, converts the label value contained in this massage and transmits the converted value to the next LSR. With this processing, the label values different from each other are assigned to the respective links configuring the LSP. This type of conventional method is incapable of indicating the LSR to assign the same label value to the LSP.

Such being the case, the LSR (the label value determination node for determining the label value that should be assigned) that starts a label value assignment process, judges whether the establishing target connection (LSP) has a possibility of taking shortcut (cut-through) routing. The label value determination node, when judging that the LSP has the possibility of taking the shortcut routing, notifies the respective LSRs on the establishing target connection (LSP) of an indication of assigning the same label value and an assignment control message containing the assignment target label value.

The label value determination node previously receives, from the network administrator (using Telnet) or the NMS or other node, the data for judging whether there is the possibility of taking the shortcut routing, then executes the judging process described above, and is thereby capable of recognizing whether the establishing target connection has the possibility of taking the shortcut routing.

The ingress node (LSR) disposed at the ingress of the establishing target connection, if functioning as the label value determination node and when recognizing that this connection has the possibility of taking the shortcut routing, pads a value for indicating that the same label value be set in a flag or a message field such as TLV (Type Length Value), into the label request message used as the assignment control message in order to assign the same label value to the establishing target connection.

Alternatively, the egress node (LSR) disposed at the egress of the establishing target connection, if functioning as the label value determination node and when recognizing that this connection has the possibility of taking the shortcut routing, pads a value for indicating that the same label value be set in the flag or the message field such as TLV, into the label mapping message used as the assignment control message.

The label assignment processing module 100 of each of the nodes (LSRs) on the establishing target connection, when receiving the label request message or the label mapping message, can learn the necessity of assigning the same label value to the establishing target connection by referring to the flag or TLV in the message. In this case, the label value in the message does not need converting, and therefore the label assignment processing module 100 does not convert the label value in the message, and this message is transmitted to the next node (see FIG. 11). Thus, the LSP concerned can be notified of the same label value.

The label assignment method (by which the label assignment processing module 100 generates the non-rewrite entry and writes this entry in the label assignment table 101B) for the same label value, is the same as that in the first embodiment. Namely, the label assignment processing module 100 of the LSR, when receiving the label request message or the label mapping message containing the flag or TLV, generates the non-rewrite entry containing the label value contained in this message, and writes this entry in the label assignment table 101B. Thus, the label value contained in the assignment control message is reflected in the label assignment table 101B.

Third Embodiment

<Example of Network Architecture>

The discussion in a third embodiment will be focused on a method of assigning the same label value to not all the links used for configuring the LSP but some proportion of these links. It is now considered to exemplify the same network including the same initial topology having the connection established as shown in FIGS. 3 and 4 as those in the first and second embodiments. Now, the discussion will be made, as in the first and second embodiments, by exemplifying the network having the connection established as the initial topology shown in FIGS. 3 and 4.

<Outline of Label Assignment Method>

According to the third embodiment, the label assignment processing module 100 (see FIGS. 2A and 10A) provided in the LSR assigns the same label value to some links between the plurality of LSRs at the ingress and the egress on a specified LSP. For example, the label assignment processing module 100 assigns a label value "7" to the link between the LSR-A and the LSR-C and the label value "5" to the links between the LSR-C and the LSR-D and between the LSR-D and the LSR-E on the LSP1. The method of thus assigning the same label value to some links is carried out, and hence the label assignment processing module 100 pads a value (called a [same label assignment indication]) indicating whether the same label is needed, into the assignment control message (the label assignment protocol) at the stage of notifying the nodes of the label values one another.

<Method of Notifying Each Node of Assigned Label Value>

A method of notifying the respective LSRs configuring the LSP concerned of the label value assigned at the ingress or the egress, may involve the use of the standard label assignment protocol used in the MPLS such as LDP, RSVP etc for switching the label value between the nodes and may involve the use of the protocol into which the routing protocol such as OSPF, BGP etc is expanded for the label assignment, or alternatively the server having the function of performing the settings in the respective nodes across the network by use of the protocol such as Telnet may set the label assignment data.

In the case of adopting LDP, as in the second embodiment, there maybe considered the method using the label request message and the method using the label-mapping message.

In the case of using the label request message, the flag or TLV explained in the second embodiment is partially used. the label assignment processing module 100 of the LSR that transmits or relays the label request message, when transmitting the label request message to the neighboring node, pads the same label assignment indication into the label request message in accordance with the indication given beforehand.

The "indication given beforehand" contains data (judgement data) for indicating that a certain node is not shortcut or the next node is shortcut. The label assignment processing module 100 of each LSR is capable of previously learning that the node itself is not shortcut or the neighboring node is shortcut (whether a link among those of the LSP established has a possibility of being shortcut) on the basis of this "indication given beforehand".

Then, the label assignment processing module 100, when transmitting the label request message, judges using the judgement data whether the neighboring node (a link between this neighboring node on the downstream side and the next node) receiving next this label request message has the possibility of being shortcut.

The label assignment processing module 100, when judging that the next node has the possibility of being shortcut, pads the flag or TLV as the same label assignment indication into the label request message, and transmits this message to the next node. By contrast, the label assignment processing module 100, when judging that the next node has no possibility of being shortcut, sends the label request message that does not contain the same label assignment indication to the next node. The label assignment processing module 100, when receiving the label request message containing the same label assignment indication, is stored with this. For instance, a "non-rewrite flag" indicating that the assigned label value is not converted is set in the label assignment processing module 100.

The above "indication given beforehand" is a piece of information specifying, e.g., a node or link having the possibility of being shortcut. For example, the network administrator or the NMS may notify each LSR of this "indication given beforehand", or each LSR may obtain the same "indication" by a node-to-node data exchange.

Figure 12:
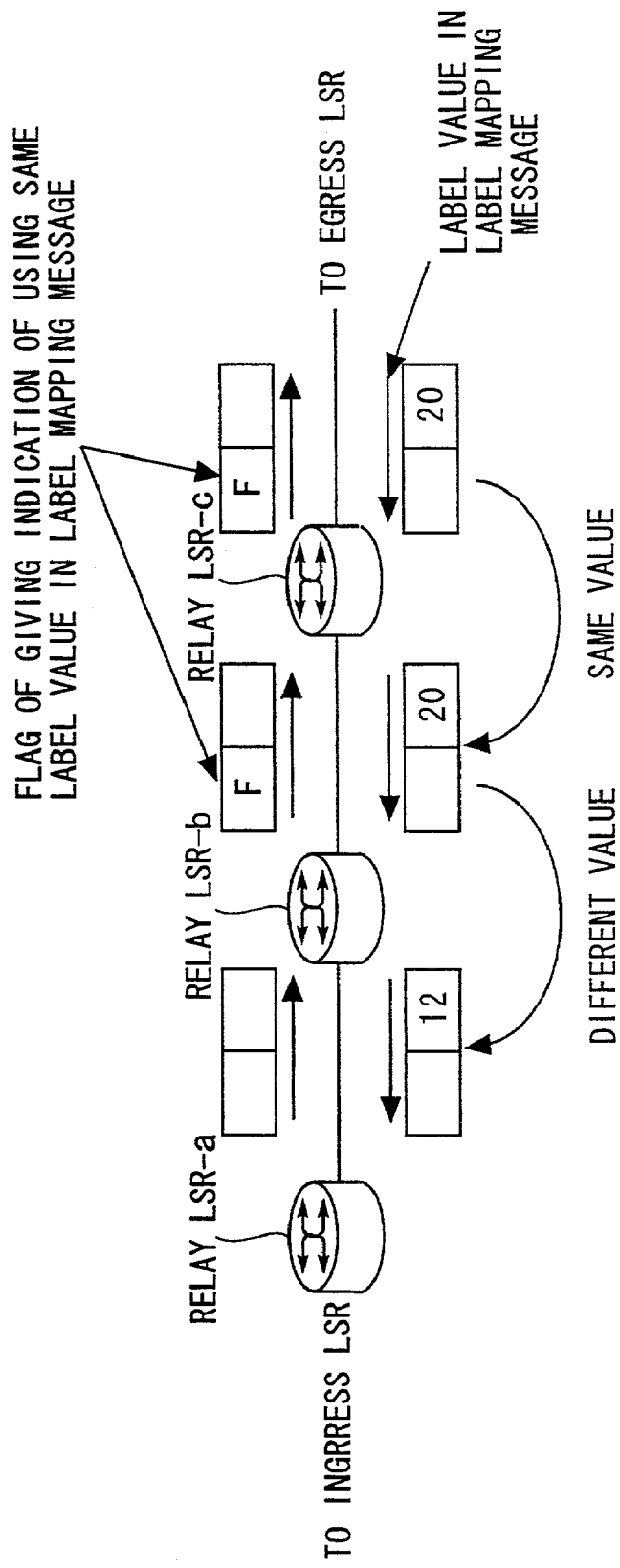
FIG. 12 is a diagram showing one of examplefor instructing whether there is the same label or not by using the label request message.

For instance, it is assumed in the example shown in FIG. 12 thata relay LSR-a knows that the LSR-a itself is not shortcut and a neighboring LSR-b has a possibility of being shortcut. The same information is indicated to the LSR-b and LSR-c. further, a flag for notifying that the LSP has a possibility of taking the shortcut routing throughout the network, may be contained in the label request message as in the second embodiment.

Thereafter, the label-mapping message functions as the assignment control message, thereby assigning the label value. In this case, the non-rewrite flag is set in the LSR receiving the label request message containing the same label assignment indication among the plurality of LSRs receiving the label-mapping message. Namely, this is a state where each node learns, from the flag value in the label request message, a necessity of assigning the same label to the links (sections) between the nodes with the non-rewrite flag set in continuity.

Therefore, the label assignment processing module 100 of each LSR, upon receiving the label-mapping message, judges whether the non-rewrite flag is set. If set, the label assignment processing module 100 executes the process of generating the non-rewrite entry 101C and the process of reflecting this entry in the label assignment table as explained in the second embodiment, and sends the label value contained in the label mapping message to the next LSR without converting this label value.

Whereas if the non-rewrite flag is not set, the label assignment processing module 100 executes the process of generating the rewrite entry 101D and the process of reflecting this entry in the label assignment table as explained in the second embodiment, and converts the label value contained in the label mapping message into a different value. Thereafter the label assignment processing module 100 transmits the converted label value to the next LSR. These processes are executed by each of the LSRs. Accordingly, for example, the LSR-c can assign the same label value before and after the input and the output.

Figure 11:
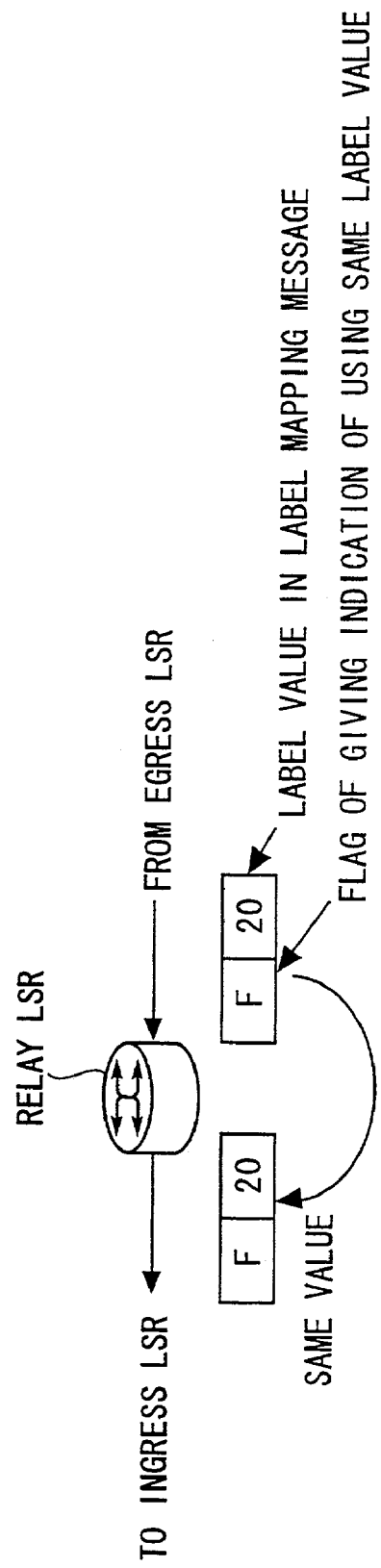
FIG. 11 is a diagram showing one of example assigning the same label value by a flag.

Next, a case of utilizing the label-mapping message will be explained. If each of the nodes knows that the link for establishing the LSP has a possibility of being shortcut, a value indicating this possibility is padded in the form of the flag or the message field such as TLV into the label-mapping message. This scheme is the same as that in the second embodiment (FIG. 11).

This value is kept as the flag, however, each of the nodes receiving this value, assuming that it is, as in the case described above, given the indication about the possibility of short cutting the node itself and the possibility of short cutting the neighboring node sending the label request message, can recognize whether there is the necessity of using the same label at the input and the output of each LSR, and hence the same or different label can be assigned to the LSP concerned.

Namely, with the label request message transmitted, the label assignment processing module 100 of each of the LSRs on the LSP sets the non-rewrite flag in accordance with the same label assignment indication. Therefore, if the non-rewrite flag is set when receiving the label-mapping message, the label assignment processing module 100 generates the non-rewrite entry by use of the label value contained in this label-mapping message and reflects it in the label assignment table. Whereas if the non-rewrite flag is not set, the label assignment processing module 100 generates the generates the rewrite entry in which the label value contained in the label mapping message is used as the input label value and reflects it in the label assignment table, and converts the label value in the label mapping message into a different value.

What is claimed is:

1. A link identifier assignment system in a connection-oriented communication network, comprising:
    a determination module for obtaining, if a connection having a possibility of changing a route is established, the same link identifier value assigned to all links contained in this connection in a network where a data block is transferred on the connection established by a plurality of nodes and by a plurality of links between said nodes, and the link for forwarding the data block is identified by a link identifier attached to the data block in each of said nodes; and
    a notifying module for notifying all of said nodes contained in the connection, of the determined link identifier value,
    wherein each of said nodes stores the notified link identifier value to forward the data block attached with this link identifier value via the link assigned with this link identifier value, and, when having a neighboring node in a receiving direction on the connection and even if said neighboring node in the receiving direction is changed to other node due to making the change of the route, receives the data block attached with the link identifier value of which said other neighboring node notifies.

2. A link identifier assignment system in a connection-oriented communication network according to claim 1, wherein said determination module determines the link identifier value to be different for every connection established in the network.

3. A link identifier assignment system in a connection-oriented communication network according to claim 1, wherein said determination module and said notifying module are provided in at least one node functioning as a start node or an end node of the connection.

4. A link identifier assignment system in a connection-oriented communication network according to claim 3, wherein said determination modules are provided in said plurality of nodes, and
    each of said determination module retains at least one link identifier value used for determining the link identifier value unduplicated between said determination modules.

5. A link identifier assignment system in a connection-oriented communication network according to claim 3, wherein said determination module generates the link identifier value different for every connection.

6. A link identifier assignment system in a connection-oriented communication network according to claim 5, wherein said determination module retains an identifier of said start or end node and a plurality of values each determined as a unique value to said every node in order to determine the link identifier value different for every connection, and generates the same link identifier value by combining the identifier with any one of the plurality of values.

7. A link identifier assignment system in a connection-oriented communication network according to claim 3, wherein said notifying module transmits the link identifier value in a way that contains this link identifier value in a message to be transferred via all said relay nodes between said start node and said end node of said connection, and
    each of said nodes, when receiving the message, stores the link identifier value contained in this message.

8. A link identifier assignment system in a connection-oriented communication network according to claim 1, wherein said determination module, if the existing connection remains established in the case of establishing a new connection and if these two connections do not include any common link, determines the same value as the link identifier value assigned to the existing connection as a link identifier value to be assigned to the new connection.

9. A link identifier assignment system in a connection-oriented communication network according to claim 1, wherein each of said nodes stores, for a certain connection, the link identifier value different for each of the links contained in this connection as an on-the-transmitting-side link identifier value corresponding to a receiving-side link identifier value attached to the data block when received, then rewrites, upon receiving the data block, the receiving-side link identifier value attached to this data block into the transmitting-side link identifier value, and forwards the data block via the link assigned with the transmitting-side link identifier value.

10. A link identifier assignment system in a connection-oriented communication network according to claim 9, wherein each of said nodes, when establishing a connection and receiving an indication of assigning a link identifier having the same value to all the links included in this connection, stores the notified link identifier value in order to forward a data block attached with this link identifier value via the link assigned with this link identifier value, then stores, when not receiving the indication, the link identifier value different for each of the links included in the connection as the transmitting-side link identifier value corresponding to the receiving-side link identifier value attached to the data block when received, and rewrites, when receiving the data block, the receiving-side link identifier value attached to this data block into the transmitting-side link identifier value, and forwards the data block via the link assigned with the transmitting-side link identifier value.

11. A link identifier assignment system in a connection-oriented communication network, comprising:
   a determination module for obtaining, if a connection including a relay node having a possibility of being shortcut is established, the same link identifier value assigned to links that link said relay node to neighboring nodes respectively in the data block receiving/transmitting directions in a network where a data block is transferred on the connection established by a plurality of nodes and by a plurality of links between said nodes, and the link for forwarding the data block is identified by a link identifier attached to the data block in each of said nodes; and
   a notifying module for notifying at least said relay node and said two neighboring nodes of the determined link identifier value,
   wherein said neighboring node in the receiving direction stores the notified link identifier value, then attaches, when receiving the data block, the notified link identifier value to this data block, and forwards this data block via the link assigned with the notified link identifier value,
   said relay node stores the notified link identifier value, and, when receiving the data block attached with the notified link identifier value, forwards the data block via the link assigned with the link identifier value attached to the data block, and
   said neighboring node in the transmitting direction stores the notified link identifier value in order to identify the link for forwarding the data block on the basis of this notified link identifier value, then receives, if said relay node is not shortcut, the data block attached with the notified link identifier value from said relay node, and receives, if said relay node is shortcut, the data block attached with the notified link identifier value from said neighboring node in the receiving direction.

12. A link identifier assignment system in a connection-oriented communication network according to claim 11, wherein said relay node, said neighboring node in the receiving direction and said neighboring node in the transmitting direction, when receiving an indication of storing the same link identifier value of which said notifying module notifies, the notified link identifier value.

13. A link identifier assignment device in a connection-oriented communication network, comprising:
   a determination module for obtaining, if a connection having a possibility of changing a route is established, the same link identifier value assigned to all links contained in this connection in a network where a data block is transferred on the connection established by a plurality of nodes and by a plurality of links between said nodes, and the link for forwarding the data block is identified by a link identifier attached to the data block in each of said nodes; and
   a notifying module for notifying all of said nodes contained in the connection, of the determined link identifier value,
   wherein each of said nodes stores the notified link identifier value to forward the data block attached with this link identifier value via the link assigned with this link identifier value, and, when having a neighboring node in a receiving direction on the connection and even if said neighboring node in the receiving direction is changed to other node due to making the change of the route, receives the data block attached with the link identifier value of which said other neighboring node notifies.

14. A link identifier assignment device in a connection-oriented communication network according to claim 13, wherein said determination module determines the link identifier value to be different for every connection established in the network.

15. A link identifier assignment device in a connection-oriented communication network according to claim 13, wherein said determination module generates the link identifier value different for every connection.

16. A link identifier assignment device in a connection-oriented communication network, comprising:
   a determination module for obtaining, if a connection including a relay node having a possibility of being shortcut is established, the same link identifier value assigned to links that link said relay node to neighboring nodes respectively in the data block receiving/transmitting directions in a network where a data block is transferred on the connection established by a plurality of nodes and by a plurality of links between said nodes, and the link for forwarding the data block is identified by a link identifier attached to the data block in each of said nodes; and
   a notifying module for notifying at least said relay node and said two neighboring nodes of the determined link identifier value,
   wherein said neighboring node in the receiving direction stores the notified link identifier value, then attaches, when receiving the data block, the notified link identifier value to this data block, and forwards this data block via the link assigned with the notified link identifier value,
   said relay node stores the notified link identifier value, and, when receiving the data block attached with the notified link identifier value, forwards the data block via the link assigned with the link identifier value attached to the data block, and said neighboring node in the transmitting direction stores the notified link identifier value in order to identify the link for forwarding the data block on the basis of this notified link identifier value, then receives, if said relay node is not shortcut, the data block attached with the notified link identifier value from said relay node, and receives, if said relay node is shortcut, the data block attached with the notified link identifier value from said neighboring node in the receiving direction.

17. A link identifier assignment method in a connection-oriented communication network, comprising:

a determination step of obtaining, if a connection having a possibility of changing a route is established, the same link identifier value assigned to all links contained in this connection in a network where a data block is transferred on the connection established by a plurality of nodes and by a plurality of links between said nodes, and the link for forwarding the data block is identified by a link identifier attached to the data block in each of said nodes; and a notifying step of notifying all of said nodes contained in the connection, of the determined link identifier value, wherein each of said nodes stores the notified link identifier value to forward the data block attached with this link identifier value via the link assigned with this link identifier value, and, when having a neighboring node in a receiving direction on the connection and even if said neighboring node in the receiving direction is changed to other node due to making the change of the route, receives the data block attached with the link identifier value of which said other neighboring node notifies.

18. A link identifier assignment method in a connection-oriented communication network according to claim 17, wherein said determination step involves determining the link identifier value to be different for every connection established in the network.

19. A link identifier assignment method in a connection-oriented communication network according to claim 17, wherein said determination step and said notifying step are executed by at least one node functioning as a start node or an end node of the connection.

20. A link identifier assignment method in a connection-oriented communication network according to claim 19, wherein when said determination steps are executed by said plurality of nodes, each of said determination steps involves retaining at least one link identifier value used for determining the link identifier value unduplicated between said determination steps.

21. A link identifier assignment method in a connection-oriented communication network according to claim 19, wherein said determination step involves generating the link identifier value different for every connection.

22. A link identifier assignment method in a connection-oriented communication network according to claim 21, wherein said determination step involves retaining an identifier of said start or end node and a plurality of values each determined as a unique value to said every node in order to determine the link identifier value different for every connection, and generating the same link identifier value by combining the identifier with any one of the plurality of values.

23. A link identifier assignment method in a connection-oriented communication network according to claim 19, wherein said notifying step involves transmitting the link identifier value in a way that contains this link identifier value in a message to be transferred via all said relay nodes between said start node and said end node of said connection, and each of said nodes, when receiving the message, stores the link identifier value contained in this message.

24. A link identifier assignment method in a connection-oriented communication network according to claim 17, wherein said determination step involves, if the existing connection remains established in the case of establishing a new connection and if these two connections do not include any common link, determining the same value as the link identifier value assigned to the existing connection as a link identifier value to be assigned to the new connection.

25. A link identifier assignment method in a connection-oriented communication network according to claim 17, wherein each of said nodes stores, for a certain connection, the link identifier value different for each of the links contained in this connection as an on-the-transmitting-side link identifier value corresponding to a receiving-side link identifier value attached to the data block when received, then rewrites, upon receiving the data block, the receiving-side link identifier value attached to this data block into the transmitting-side link identifier value, and forwards the data block via the link assigned with the transmitting-side link identifier value.

26. A link identifier assignment method in a connection-oriented communication network according to claim 25, wherein each of said nodes, when establishing a connection and receiving an indication of assigning a link identifier having the same value to all the links included in this connection, stores the notified link identifier value in order to forward a data block attached with this link identifier value via the link assigned with this link identifier value, then stores, when not receiving the indication, the link identifier value different for each of the links included in the connection as the transmitting-side link identifier value corresponding to the receiving-side link identifier value attached to the data block when received, and rewrites, when receiving the data block, the receiving-side link identifier value attached to this data block into the transmitting-side link identifier value, and forwards the data block via the link assigned with the transmitting-side link identifier value.

27. A link identifier assignment method in a connection-oriented communication network, comprising:

a determination step of obtaining, if a connection including a relay node having a possibility of being shortcut is established, the same link identifier value assigned to links that link said relay node to neighboring nodes respectively in the data block receiving/transmitting directions in a network where a data block is transferred on the connection established by a plurality of nodes and by a plurality of links between said nodes, and the link for forwarding the data block is identified by a link identifier attached to the data block in each of said nodes; and a notifying step of notifying at least said relay node and said two neighboring nodes of the determined link identifier value, wherein said neighboring node in the receiving direction stores the notified link identifier value, then attaches, when receiving the data block, the notified link identifier value to this data block, and forwards this data block via the link assigned with the notified link identifier value, said relay node stores the notified link identifier value, and, when receiving the data block attached with the notified link identifier value, forwards the data block via the link assigned with the link identifier value attached to the data block, and said neighboring node in the transmitting direction stores the notified link identifier value in order to identify the link for forwarding the data block on the basis of this notified link identifier value, then receives, if said relay node is not shortcut, the data block attached with the notified link identifier value from said relay node, and receives, if said relay node is shortcut, the data block attached with the notified link identifier value from said neighboring node in the receiving direction.

28. A link identifier assignment method in a connection-oriented communication network according to claim 27, wherein said relay node, said neighboring node in the receiving direction and said neighboring node in the transmitting direction, when receiving an indication of storing the same link identifier value of which said notifying module notifies, the notified link identifier value.

* * * * *